(12) United States Patent
Daoud Triki et al.

(10) Patent No.: US 10,616,828 B2
(45) Date of Patent: Apr. 7, 2020

(54) ACCESS NETWORK SELECTION CONDITIONED BY CELLULAR ACCESS TECHNOLOGY

(71) Applicant: ORANGE, Paris (FR)

(72) Inventors: Khadija Daoud Triki, Meudon (FR); Antoine Mouquet, Courbevoie (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/905,264

(22) PCT Filed: Jul. 15, 2014

(86) PCT No.: PCT/FR2014/051822
§ 371 (c)(1),
(2) Date: Jan. 14, 2016

(87) PCT Pub. No.: WO2015/007989
PCT Pub. Date: Jan. 22, 2015

(65) Prior Publication Data
US 2016/0157170 A1 Jun. 2, 2016

(30) Foreign Application Priority Data
Jul. 16, 2013 (FR) ..................................... 13 57002

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC .............................. H04W 48/16; H04W 48/18
(Continued)

(56) References Cited

U.S. PATENT DOCUMENTS

| 2006/0221901 A1* | 10/2006 | Yaqub | H04W 48/16 |
| | | | 370/331 |
| 2007/0019670 A1* | 1/2007 | Falardeau | H04W 48/18 |
| | | | 370/465 |
| 2011/0075608 A1* | 3/2011 | Chai | H04W 48/18 |
| | | | 370/328 |

(Continued)

FOREIGN PATENT DOCUMENTS

| CN | 101505524 A | 8/2009 |
| CN | 1020077800 A | 4/2011 |

(Continued)

OTHER PUBLICATIONS

Jeong, Sang-Soo. "Traffic off-loading method and apparatus considering congestion in the radio communication system" Application No. 1020130025058. KIPO Translation. Application Date: Mar. 8, 2013.*

(Continued)

*Primary Examiner* — Stephen J Clawson
(74) *Attorney, Agent, or Firm* — Knobbe, Martens, Olson & Bear, LLP

(57) ABSTRACT

One embodiment relates to a method of selecting an access network via a mobile terminal. The mobile terminal may obtain, from a device for selecting access networks, at least one rule for selecting access networks which ranks, according to an order of priority, a plurality of access networks comprising a cellular access network using a first cellular access technology, a cellular access network using a second cellular access technology and at least one noncellular access network. The terminal may detect at least one wireless noncellular access network and at least one cellular access network to which networks the mobile terminal can attach and select the highest priority access network, from among the access networks detected, according to the at least one selecting rule applied as a function of the cellular access technology of the cellular access network detected.

12 Claims, 2 Drawing Sheets

Figure 1:
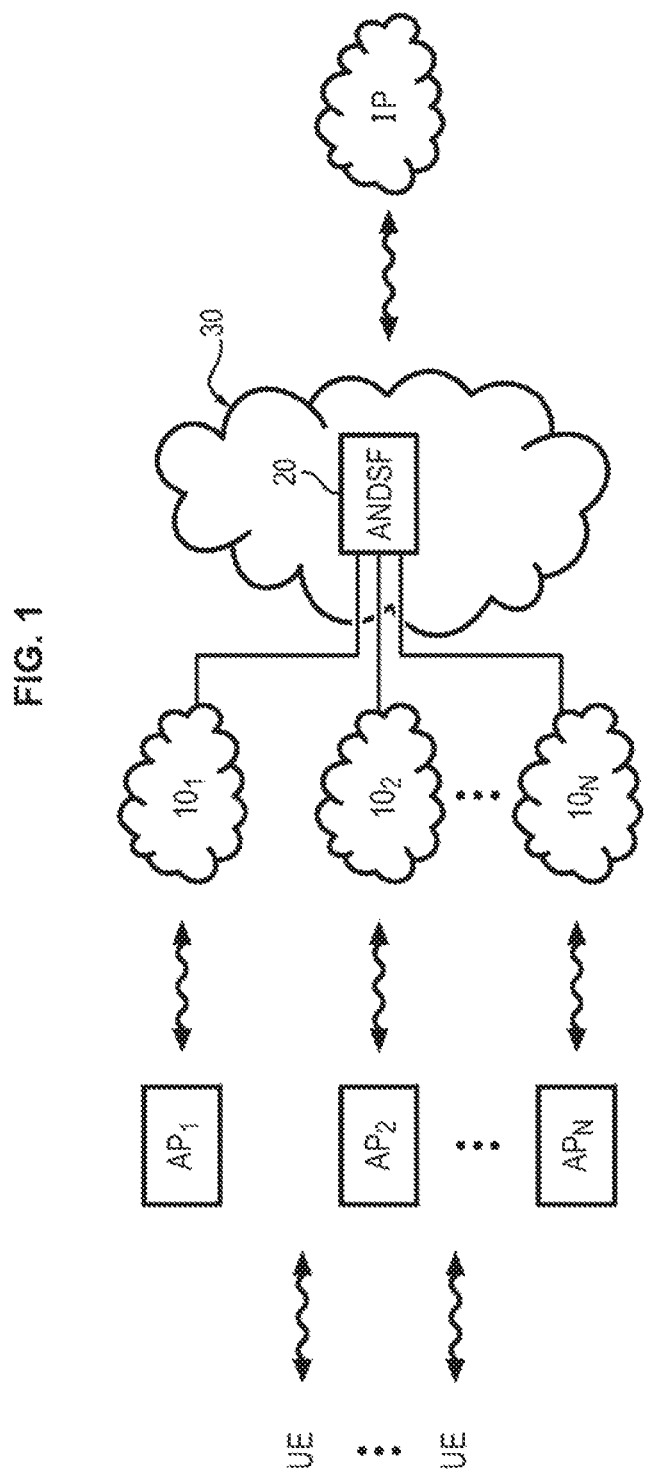

(58) Field of Classification Search
USPC .......................................................... 370/329
See application file for complete search history.

(56) References Cited

U.S. PATENT DOCUMENTS

| | | | | |
|---|---|---|---|---|
| 2011/0110300 A1* | 5/2011 | Sachs | .................... | H04W 48/18 370/328 |
| 2011/0195693 A1* | 8/2011 | Nagasawa | ......... | H04M 3/42374 455/412.2 |
| 2012/0264412 A1* | 10/2012 | Tervonen | .............. | H04W 48/08 455/418 |
| 2013/0034019 A1* | 2/2013 | Mustajarvi | ............ | H04W 48/16 370/254 |
| 2014/0029420 A1* | 1/2014 | Jeong | .................. | H04L 12/5692 370/229 |
| 2014/0162648 A1* | 6/2014 | Cui | ....................... | H04W 48/18 455/435.3 |

FOREIGN PATENT DOCUMENTS

| | | |
|---|---|---|
| EP | 2382742 A1 | 11/2011 |
| FR | 2 941 585 A1 | 7/2010 |
| WO | WO 2012/092935 A1 | 7/2012 |
| WO | WO 2012/092935 A1 | 7/2012 |
| WO | WO2012092935 | 7/2012 |

OTHER PUBLICATIONS

Ahmed et al. Inter-system mobility in evolved packet system (EPS): Connecting non-3GPP accesses, *Intelligence in Next Generation Networks (ICIN)*, 2010 IEEE 14th International Conference, Piscataway, NJ, Oct. 11, 2010, 6 pages.

3rd Generation Partnership Project; Technical Specification Group Core Network and Terminals; Access to the 3GPP Evolved Packet Core (EPC) via non-3GPP access networks; Stage 3 (Release 12). 3GPP TS 24.302, V12.1.0, 68 pages, Jun. 2013.

3rd Generation Partnership Project; Technical Specification Group Core Network and Terminals; Access Network Discovery and Selection Function (ANDSF) Management Object (MO) (Release 12). 3GPP TS 24.312, V12.1.0, 174 pages, Jun. 2013.

International Search Report dated Oct. 22, 2014 for International Application No. PCT/FR2014/051822 filed Jul. 15, 2014.

Written Opinion dated Oct. 22, 2014 for International Application No. PCT/FR2014/051822 filed Jul. 15, 2014.

Office Action dated Feb. 7, 2017 for Japanese Patent Application No. 2016-526676 (11 pages).

Office Action dated Jun. 30, 2017 for Korean Patent Application No. 10-2016-7003676 (55 pages).

$3^{rd}$ Generation Partnership Project; Technical Specification Group Core Network and Terminals; Access Network Discovery and Selection Function (ANDSF) Management Object (MO) (Release 12) (174 pages) Jun. 2013.

SA WG2 Meeting #95, Prague, Czech Republic—Jan. 28-Feb. 1, 2013 (2 pages).

French Search Report dated Jan. 13, 2014, for French Patent Application No. 1357002, filed Jul. 16, 2013.

International Preliminary Report on Patentability dated Jan. 28, 2016 for International Application No. PCT/FR2014/051822 filed Jul. 15, 2014.

\* cited by examiner

ACCESS NETWORK SELECTION CONDITIONED BY CELLULAR ACCESS TECHNOLOGY

RELATED APPLICATIONS

This application is the U.S. National Phase of Application No, PCT/FR2014/051822 entitled "ACCESS NETWORK SELECTION CONDITIONED BY CELLULAR ACCESS TECHNOLOGY" filed Jul. 15, 2014, which designated the United States, and which claims the benefit of French Application No. 1357002 filed Jul. 16, 2013.

GENERAL TECHNICAL FIELD

The invention relates to the field of radiocommunications and relates more particularly to selection mechanisms between cellular access networks and wireless non-cellular access networks (for example Wi-Fi) such as specified by the standardisation group 3GPP in the technical specifications TS 24.302 and TS 24.312.

PRIOR ART

When a user of a mobile communication terminal is subscribed with a telecommunication operator, this telecommunication operator lets the user connect to a communication network by means of his mobile terminal, by means of taking out a subscription to access several types of services originating from an IP (Internet Protocol) network, such as the Internet network.

This communication network typically comprises a cellular access network comprising a set of cellular access points to which the terminal connects. The cellular access network can be of several types (2G, 3G, 4G), each type of network being accessible according to several cellular access technologies (2G: EDGE, GPRS, 3G: UMTS, HSDPA, HSUPA, HSPA, HSPA+, 4G: LTE, LTE-Advanced).

To boost coverage and capacity of such a cellular network, the operator can provide its subscribers with an access network comprising wireless non-cellular access points of Wi-Fi or WiMAX type ("hot spot"). In this way, a communication network of an operator can comprise access points offering different standards, technologies and rates and is therefore heterogeneous, current mobile terminals being compatible with all these access points. This compatibility lets the mobile terminal access the communication network of the operator in areas where only some types of access points are available but also offers the terminal an access point offering the best service quality as a function of the service accessed, even within the same cell.

In the standards defined by the 3GPP group, and especially in the technical specifications TS 24.302 and TS 24.312, an Access Network Discovery and Selection Function (ANDSF) is provided. On request of a mobile terminal or else automatically this ANDSF server provides information on wireless non-cellular access networks. This ANDSF server also provides a selection policy which can comprise a list of wireless non-cellular access networks prioritised relative to the 3GPP cellular access network, irrespective of the technology or type.

In this way, the policies provided by the ANDSF server discriminate non-3GPP access points from each other as a function of their respective rate, but do not discriminate different cellular access technologies from a 3GPP network. In fact, selection of a type or a 3GPP cellular access technology is done at the level of the radio access network (RAN) and the ANDSF server is not meant to interfere with this selection.

In particular, when a mobile terminal is in coverage by a cellular network which can propose different cellular access technologies, the same selection policy will be applied by this mobile terminal, independently of the changes of cellular access technology which can affect the cell of the network where this terminal is found. This problem occurs also when the mobile terminal, when shifting, passes under the coverage of another cellular network using a different cellular access technology.

So, in some cases it can be interesting to prioritise differently "non-3GPP" access points relative to the "3GPP" network as a function of "3GPP" access technologies available at a given place as these "3GPP" access technologies offer considerably different rates. However, this is currently not possible.

PRESENTATION OF THE INVENTION

The present invention rectifies the abovementioned disadvantages and according to a first aspect proposes a method for selecting an access network by means of which a mobile terminal accesses a communication network, comprising the following steps, conducted by the mobile terminal:

obtaining, originating from a selection device of access networks, of at least one selection rule of access networks ranking, according to an order of priority, a plurality of access networks comprising a cellular access network using a first cellular access technology, a cellular access network using a second cellular access technology and at least one non-cellular access network;

detecting at least one wireless non-cellular access network and of at least one cellular access network to which the mobile terminal can be attached; and selecting the highest-priority access network, from the detected access networks, according to said at least one selection rule applied as a function of the cellular access technology of the detected cellular access network.

The invention lets a terminal have one or more differentiated selection policies according to a cellular access technology of a cellular access network so that it can select an access network as a function of a cellular access technology.

So in the invention the selection policies are no longer based solely on location of the terminal in the network, as is currently the case and can be adapted according to the cellular access technology which the terminal can use in its current position.

Also, the selection policies ranking differently the non-cellular access points relative to the 3GPP cellular network, as a function of the type of cellular network or of the cellular technology available discriminate 3GPP access networks in the selection method between non-cellular access networks and cellular access network.

According to a first embodiment the mobile terminal obtains a plurality of selection rules comprising at least one selection rule ranking a cellular access network using the first cellular access technology relative to at least one of said non-cellular access networks and a selection rule ranking a cellular access network using the second cellular access technology relative to at least one of said non-cellular access networks, the method further comprising the selection from said selection rules of a selection rule to be applied during selection of the access network as a function of the cellular access technology of the detected cellular access network.

This first embodiment is advantageous in that it permits differentiation of selection rules, as a function of the detected cellular access technology, based on some of the mechanisms already existing in standards and therefore can apply to networks operating according to such standards by means of a minimum of modifications.

In this first embodiment, it can be advantageous for each of the selection rules to comprise a validity indicator designating the cellular access technology used by the cellular access network ranked in said selection rule, the selection of the access network being carried out by applying the selection rule whereof the validity indicator corresponds to the access technology used by the detected cellular access network.

The use of such a validity indicator ensures, from the set of selection rules, that a single selection rule applies to a given cellular access technology, in this case the one determined by the mobile terminal for the detected cellular network, and avoids conflicts between selection policies.

Alternatively, each of said selection rules can comprise a validity indicator designating a rate interval for which said rule is applicable, and the method further comprises the determination by the mobile terminal of a transmission rate available by means of the cellular access technology used by the detected cellular access network, the selection of the access network being carried out by applying the selection rule whereof the rate interval comprises the determined transmission rate.

It is possible for the mobile terminal to differentiate the selection rules to be applied as a function of the transmission rate available on the detected cellular network, therefore indirectly as a function of the cellular access technology of this network, but without having to directly determine the cellular access technology used by this cellular network, which is not necessarily possible or can lead to errors when the cellular access technology information diffused over a cellular network is not correct. This also takes into account the transmission rate really offered by the access technology of the detected cellular network.

Alternatively, in this first embodiment, said selection rules are ranked according to an order of priority determined by the selection device, the selection rule with greatest priority being used by the mobile terminal when it selects an access network from a plurality of detected cellular access networks.

According to a second embodiment, said at least one selection rule consists of a single rule of selection ranking, by order of priority, all of said access networks. This second embodiment, even though further away from the mechanisms already existing in the standards, is advantageous in terms of simplicity of execution, both on the selection device side and the mobile terminal side.

Other characteristics of the method according to the first aspect of the invention are the following, taken singly or in combination.

The order of priority of the access networks ranked in said at least one selection rule is a function of the rates respectively associated with the access technologies used by said access networks. This especially allocates a user the access network offering him the best rate of all the access networks to which he can have access in his current position.

The order of priority of the access networks ranked in said at least one selection rule is a function of congestion information transmitted to the selection device of access networks by access points of said access networks. This dynamically updates a set of selection rules so as to modify in real or quasi-real time the order of priority of the access networks as a function of the availability or any congestion of the different access networks.

The selection step is conducted after determination of a change in cellular access technology used by one of the detected cellular networks. It is possible to select another access network in case of degradation, or on the contrary improvement, of the coverage cellular network at the site where the mobile terminal is located. This is particularly advantageous when the mobile terminal shifts within the same cell and when the cellular access technology varies due to this shift, which can make it appropriate to change access network to conserve or obtain the best quality connection possible.

The cellular access technologies can belong to the following group: 2G, 3G, 4G. Alternatively, the cellular access technologies can belong to the following group: IS95A, IS95B, EDGE, GPRS, HSDPA, HSPA, HSPA+, HSUPA, LTE, UMTS.

According to a second aspect, the invention proposes a method for assisting selection, by a mobile terminal, of an access network to which it can be attached to access a communication network, comprising the following steps:

generation of at least one selection rule of access network ranking, according to an order of priority, a plurality of access networks comprising a cellular access network using a first cellular access technology, a cellular access network using a second cellular access technology and at least one non-cellular access network using a wireless non-cellular access technology; and sending said at least one selection rule to the mobile terminal, said at least one selection rule being intended to be used by said mobile terminal during selection of an access network to which it can be attached.

According to a third aspect, the invention proposes a mobile terminal capable of receiving, originating from a selection device of access networks, at least one selection rule of access network ranking, according to an order of priority, a plurality of access networks comprising a cellular access network using a first cellular access technology, a cellular access network using a second cellular access technology and at least one non-cellular access network using a wireless non-cellular access technology, characterized in that it comprises a processing module configured to select, from at least one wireless non-cellular access network and at least one cellular access network detected by said terminal, the highest-priority access network according to said at least one selection rule applied as a function of the cellular access technology of the detected wireless access network.

According to a fourth aspect, the invention proposes a selection device of access networks, arranged to send at least one selection rule to a mobile terminal, said at least one selection rule being intended to assist the mobile terminal in its selection of an access network to which it can be attached to access a communication network, characterized in that it comprises a processing module configured to generate said at least one selection rule of access network by ranking, according to an order of priority, a plurality of access networks comprising a cellular access network using a first cellular access technology, a cellular access network using a second cellular access technology and at least one non-cellular access network using a wireless non-cellular access technology.

According to a fifth aspect, the invention proposes a computer program comprising code instructions for execution of the steps of a method according to the first aspect of the invention, when said computer program is executed by a processor.

According to a sixth aspect, the invention proposes a recording medium, readable by a device, in which is recorded the computer program according to the fifth aspect of the invention.

PRESENTATION OF FIGURES

Figure 3:
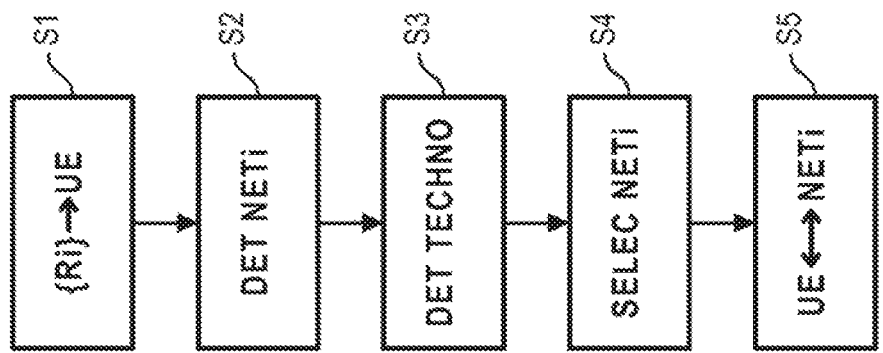
Figure 2:
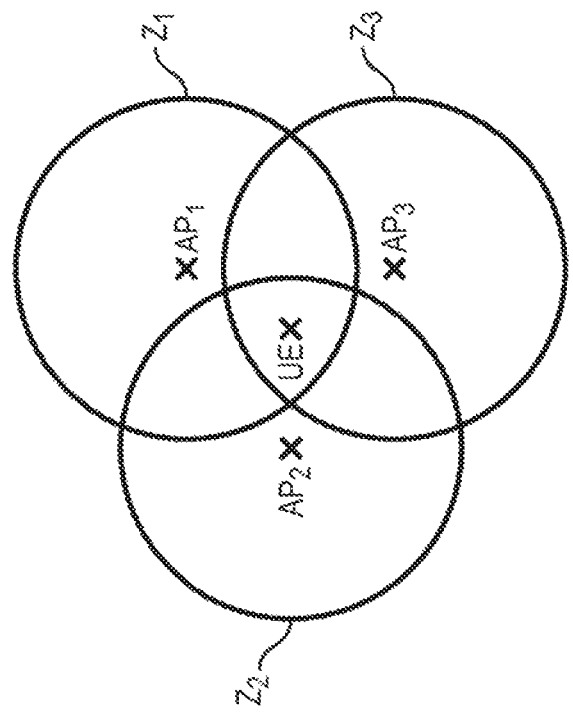

Other characteristics, aims and advantages of the invention will emerge from the following description which is purely illustrative and non-limiting and which must be considered with respect to the appended drawings in which:

FIG. 1 schematically illustrates a communication system according to the present invention;

FIG. 2 illustrates a situation where the mobile terminal UE can execute a method for selecting access networks according to an embodiment of the present invention; and FIG. 3 illustrates a method for selecting access networks according to an embodiment of the invention.

DETAILED DESCRIPTION OF THE INVENTION

In relation to FIG. 1, a communication system according to the invention is illustrated.

This system comprises several access points $AP_i$ for access to access networks $10i$ of cellular mobile access networks (e.g. 2G, 3G or 4G networks) type or of wireless non-cellular access networks (e.g. WLAN network, for example WiFi or WiMAX) type as well as at least one mobile terminal UE. Each access network $10i$ is illustrated as comprising only a single access point $Ap_i$ in FIG. 1, purely illustratively and non-limiting.

In this way, by attaching to one of the access networks $10i$, when it is under radio coverage of an access point $AP_i$ of this network $10i$ and when it attaches to this access point, the mobile terminal UE can be connected to a communication network 30 letting it access for example an IP (Internet Protocol) network of the Internet type, to access different services.

Here "be attached to an access point" means the fact that the mobile terminal UE is located in the coverage area of this access point, is authorised to access the access network of this access point and has selected this access point to access this access network. The mobile terminal UE can either be connected to this access point (that is, have a radio channel set up with this access point), or be on standby (without active radio communication). The mobile terminal UE is considered as being "attached to an access network" when it is attached to an access point of this access network.

The different access points $AP_1, \ldots, AP_N$ are either access points of a cellular access network, in which case they can be typically designated by "3GPP access points" when the access network in question is a 3GPP network, or access points to a wireless non-cellular network, in which case they can be typically designated by "non-3GPP access points" when the access network in question is not a 3GPP network. With respect to mobile cellular access networks, the access points of a 4G access network are equipment called "eNodeB", the access points of a 3G access network are equipment called "NodeB" and the access points of a 2G or GPRS access network are base stations "BTS" (for "Base Transceiver Station"). With respect to wireless non-cellular access networks, the access points of a WiFi network can be "hotspots" and the access points of a WiMAX network are WiMAX stations.

The communication network 30 also comprises a selection device 20 for access networks, typically located in the centre of this communication network 30, which, on the one hand, aids a mobile terminal UE to discover the access points of wireless non-cellular access networks to which it can be attached and, on the other hand, aids this mobile terminal UE to choose between attachment to a wireless non-cellular access point and attachment to a cellular access network, as a function of a selection policy transmitted by this selection device. Such a selection device of access networks is typically a device performing the ANDSF function such as defined in 3GPP standards, i.e. an ANDSF server according to documents TS 23.402 and 23.412. The invention is not limited to this single entity and can apply to any network having physical or logical entities having the same functionalities as this ANDSF entity.

Reference is now made to FIG. 2 which illustrates a situation where the mobile terminal UE can perform a selection method according to an embodiment of the present invention.

In this situation, the communication network 30 is accessible via three separate access networks $10_1$ to $10_3$ shown respectively by the access points $AP_1$ to $AP_3$. Each access point $AP_i$ (i=1, 2, 3) defines a radio coverage area $Z_i$ (i=1, 2, 3) in which the mobile terminal UE can be connected to this access point, and be attached to the corresponding access network $10_i$. These areas $Z_i$ which can be covered as illustrated, when the mobile terminal UE is in such a coverage area it is compelled to choose the access point network (wireless non-cellular or cellular) to which it can be attached, and therefore the access network letting it access the communication network 30, according to a selection method described hereinbelow.

In the following, cellular access technology means:
Either access technology corresponding to the generation of cellular network in question, if at a first, wider, selection level. The following access technologies are distinguished:
a 2G cellular network,
a 3G cellular network,
a 4G cellular network or
a CDMA network.
Or access technologies corresponding to a sub-category of transmission technology used in the abovementioned cellular networks, if at a second, finer, selection level. The following access technologies are distinguished:
For CDMA, IS95A, IS95B technologies;
For a 2G network, GPRS, EDGE technologies;
For a 3G network, UMTS, HSDPA, HSUPA, HSPA, HSPA+ technologies; and
For a 4G network, LTE, LTE-Advanced technologies.

Finally, wireless non-cellular access network means a Wi-Fi or WiMAX network.

The method for selecting an access network can typically be initiated while the mobile terminal UE is already attached to an access point $AP_1$ of a first access network $10_1$ (the mobile terminal UE which can be in the process of or on the point of accessing a certain type of service), and another access network is also detected by the mobile terminal UE, offering a connection alternative to this terminal.

In such a case, the mobile terminal UE can want to select a new access network by applying the selection method hereinbelow, for example to benefit from a rate higher than the rate accessible via the access point $AP_1$ or, when degradation of the connection already set up with the access point $AP_1$ is detected, to be able optionally to be attached to an access point $AP_2$ of the other access network detected to maintain good connection quality.

Alternatively, the method for selecting an access network can be initiated while the mobile terminal UE is not yet attached to an access network, but it detects that at least two separate access networks are within reach, which can be the case of powering the mobile terminal by its user. In such a case the mobile terminal UE can apply the selection method hereinbelow to directly select the access network to be attached to.

Reference is now made to FIG. 3 which illustrates a method for selecting an access point of a communication network according to an embodiment of the present invention.

In a first prior step S1, the mobile terminal UE obtains from the selection device of access networks 20 one or more selection rules {Ri} (alternatively called "selection policies") which will let it then perform selection of an access network, when it has the chance to do this.

This set of selection rules, comprising one or more selection rule(s), ranks according to an order of priority defined by the selection device 20 one or more cellular access networks using separate cellular technologies, as well as one or more wireless non-cellular access networks. In other terms, this set of selection rules proposes prioritised ranking relating, on the cellular network side, to at least two different access technologies and, on the wireless non-cellular networks side, to one or more wireless non-cellular networks.

The order of priority used by the selection device 20 to rank access networks in the set of selection rules can be a function of rates respectively associated with access technologies used by these access networks. The selection device 20 can utilise values of rate fixed in 3GPP standards, which generates a set of relatively static selection rules. According to another more dynamic alternative the rates of utilisable different access technologies are measured and the selection device 20 uses these measurements to prioritise the access networks in the set of selection rules.

As a complement to this prioritisation policy of access networks according to rates associated with the different access technologies, the selection device 20 can define the order of priority as a function of congestion information which can be raised by different access points of the access networks, and dynamically update this set of selection rules to modify in time or quasi-real real the order of priority of the access networks as a function of the availability or any congestion of the different access networks. In this case, the different selection rules are transmitted to the mobile terminal UE after such updating so that this terminal UE has selection rules corresponding to the status of the access networks.

This set of selection rules can take the form of a file, for example in xml format, generated by the selection device 20 before being transmitted to the mobile terminal UE and using a syntax similar to the syntax defined in the specification 3GPP TS 24.312.

On completion of this prior step, the mobile terminal UE has one or more differentiated selection policies according to a cellular access technology of a cellular access network, these policies no longer based solely on the location of the terminal UE in the network, as can be done currently with ANDSF. With such a set of selection rules the mobile terminal UE is capable of prioritising the cellular networks differently relative to the wireless non-cellular networks, as a function of the cellular access technology used by the cellular network(s) and which it can access in its current position.

The mobile terminal UE then monitors the access networks to which it can be attached in its current position, i.e. the access networks under the coverage of which it now is, to detect whether it has a choice of access network at its disposition. Detection of the access networks to which the terminal can be attached is executed by the terminal itself according to known techniques which will not be described here.

When the mobile terminal UE detects (step S2) at the same time one (or more) wireless non-cellular access network and one (or more) cellular access network to which it can be attached (i.e. in the coverage of which it now is in its current position), it determines (step S3) for each detected cellular access network the cellular access technology which it can use to be attached to an access point of this cellular network.

This determination step S3 can in particular be performed after detection of a new cellular access network to which the mobile terminal UE is not already attached or after detection of a cellular access network with which the mobile terminal has no set active connection (e.g. the mobile terminal being on standby). With respect to a detected cellular access network with which the mobile terminal already has an active connection, this determination step S3 can be optional.

To execute this determination, the mobile terminal UE can be based on the information of cellular access technology inserted into the SIB field of signalling messages diffused by this network. As this type of information can however not be completely reliable, an advantageous alternative consists of the mobile terminal UE determining this cellular access technology by initiating set-up of a connection with the detected cellular network, for example by means an RRC connection. The detected cellular network then returns to the mobile terminal UE an information message containing an indicator of the cellular access technology utilisable to connect with it. The mobile terminal UE can store this indication in a cache memory to be used later in the selection process without necessarily continuing the connection process to the detected cellular network.

The mobile terminal UE can also perform this determination autonomously. For example, when the mobile terminal UE is initially near the centre of a 3G cell to which it is attached, which it can determine by means of measuring the power of the received radio signal exceeding a certain threshold, it can determine that it can utilise the access technology HSPA+ in this cell. On the contrary, it can determine being at the edge of this cell when it measures a radio signal power received below a certain threshold. In this case, it can determine that it can use only the access technology UMTS in this cell.

Once the technology(ies) of the detected cellular access network(s) is determined, the mobile terminal UE selects (step S4) from the different detected access networks, the access network to be attached to, by means of the set of selection rules received, by choosing from the detected networks the highest-priority network according to this set of rules given the cellular access technology of the detected cellular access network(s). In other terms, this set of selection rules applies a different selection order as a function of this cellular access technology.

This selection step S4 can be performed whenever detection step S2 of access networks reveals a new available access network, whether cellular or wireless non-cellular, for attachment of the mobile terminal UE.

This selection step S4 can also be performed as soon as the mobile terminal UE determines a change in cellular access technology for a detected cellular access network. In this way, when the mobile terminal UE is connected to a 3G access point by means of the HSPA+ access technology and detects a replacement of this technology by the UMTS access technology (e.g. during degradation of the existing connection or shift of the terminal towards the edge of the cell), or vice versa when the mobile terminal UE is connected to a 3G access point by means of the UMTS access technology and detects a replacement of this access technology by the HSPA+ technology (e.g. during improvement of the existing connection or shift of the terminal towards the centre of the cell), it can trigger the selection procedure to optionally select another access network.

When the selected access network proves to be the access network to which the mobile terminal UE is already attached, this attachment is simply retained without modification. By comparison, if the selected access network is a new access network, different to the access network to which the mobile terminal UE is already attached, the mobile terminal UE attaches (step S5) to this new access network by selecting an access point of this selected network to which it can be attached. It can also interrupt its attachment with the former access network. The application of this selection rule according to the method defined in the specification 3GPP TS 24.312 compels the mobile terminal UE to choose in its environment an access point of the access network selected in terms of service quality.

In a first embodiment, the set of selection rules recovered by the mobile terminal UE from the selection device 20 consists of a single selection rule. This selection rule then ranks relative to each other:

At least one cellular access network using a first cellular access technology and a cellular access network (which can be the same as the previous) using a second cellular access technology, different to the first technology, and one or more wireless non-cellular access networks (typically several wifi networks offering different levels of security and/or of rate).

By way of example, this global rule can rank access networks according to the following order of priority, decreasing as a function of the rate offered by the access technologies used by these access networks:

4G>Wifi1>3G+>Wifi2>3G>Wifi3>2G, where:

"4G" designates any latest-generation cellular access network offering the mobile terminal UE the possibility of using access technology 4G (e.g. LTE, LTE-advanced)

"3G+" designates any third-generation cellular access network offering the mobile terminal UE the possibility of using advanced 3G access technology relative to basic 3G access technology (e.g. HSPA or HSDPA)

"3G" designates any third-generation cellular access network offering the mobile terminal UE the possibility of using basic 3G access technology (e.g. UMTS, Rel-99)

"2G" designates any second-generation cellular access network offering the mobile terminal UE the possibility of using 2G access technology (e.g. GPRS, EDGE).

"Wifi1" designates a first wireless non-cellular access network of wifi type offering a transmission rate (in descending and/or ascending order) lower than the rate obtained with 4G access technology, but greater than the rate obtained with advanced 3G access technologies.

"Wifi2" designates a second wireless non-cellular access network of wifi type offering a transmission rate (in descending and/or ascending order) lower than the rate obtained with advanced 3G access technologies, but greater than the rate obtained with basic 3G access technologies.

"Wifi3" designates a third wireless non-cellular access network of wifi type offering a transmission rate (in descending and/or ascending order) lower than the rate obtained with basic 3G access technologies, but greater than the rate obtained with 2G access technologies.

This first embodiment is especially and advantageously applicable when the mobile terminal UE has the faculty to select from several cellular access technologies, and therefore the cellular access technology is not imposed on it by the radio access networks (RANs). In this case, the selection device 20 can be located in an entity of the access network(s) to which this terminal can be attached. This first embodiment however applies also in the usual case in point where a single cellular access technology is imposed by radio access networks (RANs) on the terminal UE. In this case, with each detected change of cellular access technology, the mobile terminal UE can reapply the selection rule to optionally select a new access network which would become priority due to the change in cellular access technology.

In another embodiment, the set of selection rules sent by the selection device 20 comprises several selection rules, each applicable as a function of the cellular access technology with which the mobile terminal UE can be attached to a cellular network it detects. Each of these rules ranks a single set of cellular access networks using one or more cellular access technologies, relative to one or more wireless non-cellular access networks, according to an order of priority defined by the selection device 20.

In this other embodiment, it is advantageous that no cellular access technology is concerned by two separate selection rules to ensure that, from the set of selection rules, a single selection rule applies to a given cellular access technology.

To implement such a condition, one (or even more) validity indicator can be inserted into each selection rule, each validity indicator designating a separate cellular access technology for which the selection rule applies, when it contains this indicator. Such a validity indicator can be inserted into an existing field of a selection rule transmitted by an ANDSF entity, this field conditioning application of the rule according to a location criterion, typically in the "ValidityArea" field such as defined in the normative document TS 24.312.

When the different cellular access technologies known at this stage are considered, these validity indicators can take the following forms:

"NETWORK_TYPE_2G": indicates that the selection rule containing this indicator is valid whenever the mobile terminal UE can be attached to an access point of a cellular access network 2G, using any 2G access technology;

"NETWORK_TYPE_3G": indicates that the selection rule containing this indicator is valid whenever the mobile terminal UE can be attached to an access point of a 3G cellular access network, using any 3G access technology;

"NETWORK_TYPE_4G": indicates that the selection rule containing this indicator is valid whenever the mobile terminal UE can be attached to an access point of a 4G cellular access network, using any 4G access technology.

"NETWORK_TYPE_GPRS": indicates that the selection rule containing this indicator is valid whenever the mobile terminal UE can be attached to an access point of a 2G cellular access network by using the GPRS access technology;

"NETWORK_TYPE_EDGE": indicates that the selection rule containing this indicator is valid whenever the mobile terminal UE can be attached to an access point of a 2G cellular access network by using the EDGE access technology;

"NETWORK_TYPE_UMTS": indicates that the selection rule containing this indicator is valid whenever the mobile terminal UE can be attached to an access point of a 3G cellular access network by using the UMTS access technology;

"NETWORK_TYPE_HSDPA": indicates that the selection rule containing this indicator is valid whenever the mobile terminal UE can be attached to an access point of a 3G cellular access network by using the HSDPA access technology;

"NETWORK_TYPE_HSUPA": indicates that the selection rule containing this indicator is valid whenever the mobile terminal UE can be attached to an access point of a 3G cellular access network by using the HSUPA access technology;

"NETWORK_TYPE_HSPA": indicates that the selection rule containing this indicator is valid whenever the mobile terminal UE can be attached to an access point of a 3G cellular access network by using the HSPA access technology;

"NETWORK_TYPE_HSPAP": indicates that the selection rule containing this indicator is valid whenever the mobile terminal UE can be attached to an access point of a 3G cellular access network by using the HSPA+ access technology;

"NETWORK_TYPE_LTE": indicates that the selection rule containing this indicator is valid whenever the mobile terminal UE can be attached to an access point of a 4G cellular access network by using the LTE access technology.

By way of example, the following set of selection rules can be utilised:

Selection Rule 1: When the mobile terminal UE can be attached to a 4G access point or to a 3G access point by using the cellular access technology HSPA+, the access networks of type Wi-Fi private have priority level 1 (because they are supposed to offer a better rate than that of 3GPP access networks), the cellular access networks have priority level 2 (for 4G or HSPA+ cellular access technologies selected at the level of the RAN), and the other Wi-Fi access networks have priority level 3 (because they are supposed to offer rates lower than those of the cellular access network. The applicability of this priority rule 1 can be conditioned by inserting the abovementioned indicators "NETWORK_TYPE_HSPAP" and "NETWORK_TYPE_4G".

Selection Rule 2: When the mobile terminal UE can be attached to a 3G access point by using HSPA or HSDPA cellular access technologies, the access networks of private Wi-Fi or operator Wi-Fi type have priority level 1 (because they are supposed to offer a better rate than the HSPA technology), the cellular access networks have priority level 2 (for HSPA or HSPDA cellular access technologies selected at the level of the RAN), and community Wi-Fi access networks have priority level 3 (because they are supposed to offer rates lower than those of HSDPA technology). The applicability of this priority rule 2 can be conditioned by inserting the abovementioned indicators "NETWORK_TYPE_HSPA" and "NETWORK_TYPE_HSDPA".

Selection Rule 3: When the mobile terminal UE can be attached to a 2G access point or to a 2G access point by using the UMTS cellular access technology, all the Wi-Fi access networks have priority level 1 (because they are supposed to offer a better rate than that of the UMTS technology) and the 3GPP access networks have priority level 2 (for 2G and UMTS cellular access technologies selected at the level of the RAN). The applicability of this priority rule 3 can be conditioned by inserting the abovementioned "NETWORK_TYPE_UMTS" and "NETWORK_TYPE_2G" indicators.

In this way, during a third selection step S4, the mobile terminal UE determines for each of the selection rules received if it is applicable with respect to the cellular access technology determined in step S3, a selection rule being considered as being applicable if it relates to the cellular access technology used by a detected cellular network, which is determined by verifying if the validity indicator designating such a cellular access technology is inserted in this rule.

At this stage, to the extent where a single cellular access technology is determined and each cellular access technology can be concerned by a single selection rule only, a single selection rule is determined as being applicable from the different rules received and it is this selection rule which is used by the mobile terminal UE to decide on the access network to which it can be attached.

In this way, by reprising the previous example, when the mobile terminal UE is under coverage of a single 3G cellular network and the latter proposes the best 3G cellular access technology possible (i.e. HSPA+), it is the selection rule 1 which applies automatically, simply because the HSPA+ access technology is proposed as priority to the mobile terminal UE by the 3G access network.

When it is no longer possible to use the HSPA+ technology (for example when the mobile terminal UE enters a building but remains under coverage of the 3G network) and when the 3G network proposes that the terminal UE uses the HSPA cellular access technology instead, the selection rule 2 becomes the rule to be applied by the mobile terminal UE, which can cause attachment of the terminal UE to an operator Wifi network (if the terminal UE detects that it is under coverage of such a network) which was not preferred with the selection rule 1 previously applied.

The set of selection rules transmitted by the selection device 20 can be written in the form of an xml file as follows:

```
<Policy>
    <RulePriority>1</RulePriority>
    <PrioritizedAccess>
        <AccessTechnology>3</AccessTechnology>
        <AccessId>operator1</AccessId>
        <AccessNetworkPriority>1<AccessNetworkPriority>
    </PrioritizedAccess>
    <PrioritizedAccess>
        <AccessTechnology>3</AccessTechnology>
        <AccessId>operator2</AccessId>
        <AccessNetworkPriority>2</AccessNetworkPriority>
    </PrioritizedAccess>
    <PrioritizedAccess>
        <AccessTechnology>1</AccessTechnology>
        <AccessNetworkPriority>3</AccessNetworkPriority>
    </PrioritizedAccess>
    <ValidityArea>
        <N3GPP_Location>
            <PLMN>XXX</PLMN>
            <LAC>01</LAC>
            <GERAN_CI >01</GERAN_CI>
        </N3GPP_Location>
```

-continued

```
    </ValidityArea>
    <PLMN>XXX</PLMN>
</Policy>
<Policy>
    <RulePriority>1</RulePriority>
    <PrioritizedAccess>
        <AccessTechnology>3</AccessTechnology>
        <AccessId>operator1</AccessId>
        <AccessNetworkPriority>1</AccessNetworkPriority>
    </PrioritizedAccess>
    <PrioritizedAccess>
        <AccessTechnology>1</AccessTechnology>
        <AccessNetworkPriority>2</AccessNetworkPriority>
    </PrioritizedAccess>
    <PrioritizedAccess>
        <AccessTechnology>3</AccessTechnology>
        <AccessId> operator1</AccessId>
        <AccessNetworkPriority>3</AccessNetworkPriority>
    </PrioritizedAccess>
    <ValidityArea>
            </N3GPP_Location>
            <PLMN>XXX</PLMN>
            <LAC>01</LAC>
            <UTRAN_CI >02</UTRAN_CI >
        </N3GPP_Location>
    </ValidityArea>
    <PLMN>XXX</PLMN>
</Policy>
<Policy>
    <RulePriority>1</RulePriority>
    <PrioritizedAccess>
        <AccessTechnology>1</AccessTechnology>
        <AccessNetworkPriority>1</AccessNetworkPriority>
    </PrioritizedAccess>
    <PrioritizedAccess>
        <AccessTechnology>3</AccessTechnology>
        <AccessNetworkPriority>2</AccessNetworkPriority>
    </PrioritizedAccess>
    <ValidityArea>
            </N3GPP_Location>
            <PLMN>XXX</PLMN>
            <TAC>01</LAC>
            <EUTRAN_CI >02</EUTRAN_CI >
        </N3GPP_Location>
    </ValidityArea>
    <PLMN>XXX</PLMN>
</Policy>
```

In this file, the first rule applies to 2G access technologies and gives priority to a first wifi network (operator 1) relative to a second wifi network (operator 2), itself priority over 2G networks. The second rule applies to 3G technologies and gives priority to a first wifi network (operator 1) relative to 3G technologies, themselves priority relative to a second wifi network (operator 2). The third rule applies to 4G technologies and gives priority to the latter over any wifi network, independently of their operator. The condition of applicability of each rule is determined by means of the validity indicators <GERAN_CI>01</GERAN_CI>, <UTRAN_CI>02</UTRAN_CI> and <EUTRAN_CI>02</EUTRAN_CI>.

As a variant, instead of inserting into the selection rules a validity indicator designating directly the cellular access technology conditioning application of the rule, it is possible to insert a validity indicator designating a rate interval for which said rule is applicable, which indirectly allows conditioning of the rule relative to a given access technology without having to directly determine this access technology, since cellular access technologies offer rates separate to each other. This also takes into account the real transmission rate. By way of example, an H+ network which, at any given moment, offers just a rate of 1 Mb/s can be deprioritised relative to a Wi-Fi network.

In such a variant, the method further comprises determination by the mobile terminal of a transmission rate available by means of the cellular access technology used by the detected cellular access network. Once this rate is determined, selection of the access network is done by applying the selection rule whereof the rate interval comprises the determined transmission rate, in other terms the selection rule applicable for this transmission rate.

This conditions the selection rules as a function of the rate really offered by the available cellular access network, in the current position of the mobile terminal, and at any given instant, and therefore takes into account the case where this rate is significantly lower than the theoretical rate of the technology used.

This also conditions the selection rules even when the available information on the cellular access technology, in the current position of the mobile terminal, is not accessible, for example because the selection logic is conducted in an application which has no access to information relative to the radio layer of the terminal.

It is possible to envisage another case in point where the mobile terminal UE detects in its current position several cellular access networks proposing several separate cellular access technologies which it can select. In such a case in point several selection rules can be applicable.

To resolve this conflict of rules, the selection rules can be advantageously ranked by order of priority. In this way, when several selection rules are determined as being applicable simultaneously, the mobile terminal UE selects from these applicable rules the selection rule to be applied, which typically proves to be the highest-priority selection rule of the applicable rules sent by the selection device 20. The priority level of a selection rule can be indicated by a "RulePriority" field inserted into each selection rule, as defined in the specification 3GPP TS 24.312 and illustrated by the abovementioned xml file.

Once the selection rule to be applied is determined, the mobile terminal UE utilises this rule to choose the access network to which it can be attached, by selecting the highest-priority access network according to this selection rule from the detected access networks.

In this way, by repeating the previous example and given the selection rule 1 is priority relative to the selection rule 2 itself priority relative to the selection rule 3, when the mobile terminal UE is under coverage of a 4G network, a 2G network and a Wifi community network, selection rules 1 and 3 are applicable, and it is selection rule 1 which applies as a priority of these rules, resulting in selection of the 4G network for attachment of the terminal UE. When, after being shifted for example, the mobile terminal UE ceases to detect the 4G network but continues to be in the coverage of the 2G network and of the Wifi community network, selection rule 3 becomes applicable, resulting in selection of the Wifi community network for attachment of the terminal UE.

The invention is not limited to the selection method described previously, but also relates to a mobile terminal UE and a selection device 20 arranged to send at least one selection rule to a mobile terminal UE, said at least one selection rule being intended to assist the mobile terminal in its selection of an access network to which it can be attached to access a communication network 30.

The selection device 20 comprises especially, apart from an interface network, a processing module configured to generate said at least one selection rule of access network by ranking, according to an order of priority, a plurality of access networks comprising a cellular access network using a first cellular access technology, a cellular access network using a second cellular access technology and at least one non-cellular access network using a wireless non-cellular access technology.

The mobile terminal UE is capable of receiving, originating from a selection device 20 of access networks, at least one selection rule of access network ranking, according to an order of priority, a plurality of access networks comprising a cellular access network using a first cellular access technology, a cellular access network using a second cellular access technology and at least one non-cellular access network using a wireless non-cellular access technology.

The mobile terminal UE comprises especially, apart from a first radio interface and a second radio interface, a processing module configured to select from at least one wireless non-cellular access network and at least one detected cellular access network by said terminal the highest-priority access network according to said at least one selection rule applied as a function of the cellular access technology of the detected wireless access network.

The terms "modules" can correspond in this document both to a software component and to a hardware component capable of executing a function or a set of functions according what is described previously for the relevant module.

A software component corresponds to one or more computer programs, one or more sub-programs of a program, or more generally to any element of a program or software. Such a software component is stored in memory, then loaded and executed by a data processor of a physical entity and is likely to access the hardware resources of this physical entity (memories, recording media, communication buses, interfaces).

In the same way, a hardware component corresponds to any element of hardware. It can be a programmable hardware component or not with or without integrated processor for execution of software. It can be for example an integrated circuit, smart card, electronic card for execution of firmware, etc.

In a particular embodiment, the abovementioned processing modules are arranged to execute the methods described previously, on the selection device 20 side and mobile terminal side. These are preferably software modules comprising software instructions to have the steps of the methods described previously executed. The invention therefore also relates to:

a computer program, for selection of an access network, comprising code instructions for controlling execution of the steps taken on the mobile terminal UE side in the method for selecting an access network described previously;

a recording medium, readable by a mobile terminal, on which this program is recorded for selection of an access network;

a computer program, for assistance with the selection of an access network, comprising code instructions for controlling the execution of steps taken on the selection device 20 side in the method for selecting an access network described previously.

a recording medium, readable by a selection device, on which this program is recorded for the assistance with the selection of an access network.

These software modules can be stored in or transmitted via a data medium which can be a hardware storage medium (for example a CD-ROM, a USB drive, a memory card or a hard drive), or else a transmission medium such as an electric, optic or radio signal, or even a telecommunication network.

The invention claimed is:

1. A method for selecting an access network via a mobile terminal, the method comprising:

obtaining, originating from a selection device of access networks, at least one selection rule of access networks differentiated according to a cellular access technology of a cellular access network, the selection rule ranking, according to an order of priority, a plurality of access networks comprising a cellular access network using a first cellular access technology, a cellular access network using a second cellular access technology and at least one non-cellular access network, wherein the at least one selection rule comprises a validity indicator designating a rate interval comprising a determined transmission rate;

detecting, via signals received at the mobile terminal, at least one wireless non-cellular access network and at least one cellular access network to which the mobile terminal can be attached; and selecting the highest-priority access network, from the detected access networks, according to the at least one selection rule given the cellular access technology used by the detected cellular access network, by applying the selection rule whereof the rate interval comprises the determined transmission rate so that communication signals are transmitted to and received from the mobile terminal;

wherein the mobile terminal obtains a plurality of selection rules comprising at least one selection rule ranking a cellular access network using the first cellular access technology relative to at least one of the non-cellular access networks and a selection rule ranking a cellular access network using the second cellular access technology relative to at least one of the non-cellular access networks, the method further comprises selecting, from the plurality of selection rules, a selection rule to be applied during selection of the access network as a function of the cellular access technology of the detected cellular access network, and wherein each of the selection rules comprises a validity indicator designating at least a sub-category of transmission technology used by the cellular access network ranked in the selection rule, the selection of the access network being carried out by applying the selection rule whereof the validity indicator corresponds to the at least a sub-category of transmission technology used by the detected cellular access network.

2. The method according to claim 1, wherein the selection rules are ranked according to an order of priority determined by the selection device, the highest-priority selection rule being used by the mobile terminal when it selects an access network from a plurality of detected cellular access networks.

3. The method according to claim 1, wherein the at least one selection rule consists of a single rule of selection ranking, by order of priority, all of the access networks.

4. The method according to claim 1, wherein the order of priority of the access networks ranked in the at least one selection rule is a function of the rates respectively associated with the access technologies used by the access networks.

5. The method according to claim 1, wherein the order of priority of the access networks ranked in the at least one selection rule is a function of congestion information transmitted to the selection device of access networks by access points of the access networks.

6. The method according to claim 1, wherein the selection process is conducted after a detection of a change in availability of cellular access technologies usable by one of the mobile terminals.

7. The method according to, claim 1 wherein the cellular access technologies are one of the following: 2G (GERAN), 3G (UTRAN) and 4G (E-UTRAN).

8. The method according to claim 1, wherein the cellular access technologies are one of the following: IS95A, IS95B, EDGE, GPRS, HSDPA, HSPA, HSPA+, HSDPA, LTE and UMTS.

9. A method for assisting selection, by a mobile terminal, of an access network to be used to access a communication network, comprising:
generating at least one selection rule differentiated according to a cellular access technology of a cellular access network, the selection rule ranking, according to an order of priority, a plurality of access networks comprising a cellular access network using a first cellular access technology, a cellular access network using a second cellular access technology and at least one non-cellular access network using a wireless non-cellular access technology; and
sending the at least one selection rule to the mobile terminal, the at least one selection rule being used by the mobile terminal during selection of an access network to which it can be attached and comprising a validity indicator designating a rate interval comprising a determined transmission rate so that communication signals are transmitted to and received from the mobile terminal,
wherein the mobile terminal obtains a plurality of selection rules comprising at least one selection rule ranking a cellular access network using the first cellular access technology relative to at least one of the non-cellular access networks and a selection rule ranking a cellular access network using the second cellular access technology relative to at least one of the non-cellular access networks, the method further comprises selecting, from the plurality of selection rules, a selection rule to be applied during selection of the access network as a function of the cellular access technology of the detected cellular access network, and
wherein each of the selection rules comprises a validity indicator designating at least a sub-category of transmission technology used by the cellular access network ranked in the selection rule, the selection of the access network being carried out by applying the selection rule whereof the validity indicator corresponds to the at least a sub-category of transmission technology used by the detected cellular access network.

10. A mobile terminal for selecting an access network, the mobile terminal comprising:
a memory device configured to store a set of instructions; and
one or more processors configured to execute the set of instructions that cause the one or more processors to:
receive, originating from a selection device of access networks, at least one selection rule differentiated according to a cellular access technology of a cellular access network, the selection rule comprising a validity indicator designating a rate interval comprising a determined transmission rate and ranking, according to an order of priority, a plurality of access networks comprising acellular access network using a first cellular access technology, a cellular access network using a second cellular access technology and at least one non-cellular access network using a wireless non-cellular access technology;
detect, via signals received at the mobile terminal, at least one wireless non-cellular access network and at least one cellular access network to which the mobile terminal can be connected to; and
select, from the detected access networks, the highest-priority access network according to the at least one selection rule given the cellular access technology used by the detected wireless access network, by applying the selection rule whereof the rate interval comprises the determined transmission rate so that communication signals are transmitted to and received from the mobile terminal,
wherein the mobile terminal obtains a plurality of selection rules comprising at least one selection rule ranking a cellular access network using the first cellular access technology relative to at least one of the non-cellular access networks and a selection rule ranking a cellular access network using the second cellular access technology relative to at least one of the non-cellular access networks, the method further comprises selecting, from the plurality of selection rules, a selection rule to be applied during selection of the access network as a function of the cellular access technology of the detected cellular access network, and
wherein each of the selection rules comprises a validity indicator designating at least a sub-category of transmission technology used by the cellular access network ranked in the selection rule, the selection of the access network being carried out by applying the selection rule whereof the validity indicator corresponds to the at least a sub-category of transmission technology used by the detected cellular access network.

11. A system for selecting access networks, the system comprising:
a memory device configured to store a set of instructions; and
one or more processors configured to execute the set of instructions that cause the one or more processors to:
send at least one selection rule to a mobile terminal, the at least one selection rule comprising a validity indicator designating a rate interval comprising a determined transmission rate being configured to assist the mobile terminal in its selection of an access network to which it can be attached to access a communication network; and generate the at least one selection rule of access network differentiated according to a cellular access technology of a cellular access network, the the selection rule ranking, according to an order of priority, a plurality of access networks comprising a cellular access network using a first cellular access technology, a cellular access network using a second cellular access technology and at least one non-cellular access network using a wireless non-cellular access technology,
wherein the mobile terminal obtains a plurality of selection rules comprising at least one selection rule ranking a cellular access network using the first cellular access technology relative to at least one of the non-cellular access networks and a selection rule ranking a cellular access network using the second cellular access technology relative to at least one of the non-cellular access networks, the method further comprises selecting, from the plurality of selection rules, a selection rule to be applied during selection of the access network as a function of the cellular access technology of the detected cellular access network, and wherein each of the selection rules comprises a validity indicator designating at least a sub-category of transmission technology used by the cellular access network ranked in the selection rule, the selection of the access network being carried out by applying the selection rule whereof the validity indicator corresponds to the at least a sub-category of transmission technology used by the detected cellular access network.

12. A non-transitory computer readable medium having stored thereon instructions for performing the method according to claim 1, when the instructions are executed by a processor.

* * * * *